(12) United States Patent
Mackie et al.

(10) Patent No.: US 8,689,558 B2
(45) Date of Patent: Apr. 8, 2014

(54) PROPFAN ENGINE

(75) Inventors: Kenneth J Mackie, Derby (GB); Richard H Standing, Derby (GB)

(73) Assignee: Rolls-Royce PLC, London (GB)

( * ) Notice: Subject to any disclaimer, the term of this patent is extended or adjusted under 35 U.S.C. 154(b) by 599 days.

(21) Appl. No.: 12/777,582

(22) Filed: May 11, 2010

(65) Prior Publication Data

US 2010/0293920 A1    Nov. 25, 2010

(30) Foreign Application Priority Data

May 20, 2009  (GB) .................................... 908595.2

(51) Int. Cl.
*F02C 7/24* (2006.01)
*F02K 3/00* (2006.01)
*B05B 3/02* (2006.01)

(52) U.S. Cl.
USPC ........................... 60/725; 60/268; 239/222.13

(58) Field of Classification Search
USPC .......... 60/268, 39.5, 725, 226.1, 39.162, 224, 60/225, 244; 239/222.11, 222.13; 415/157, 158, 166, 167, 126–128
See application file for complete search history.

(56) References Cited

U.S. PATENT DOCUMENTS

| | | | | |
|---|---|---|---|---|
| 2,611,317 A * | 9/1952 | Africano | ....................... 244/3.23 |
| 3,084,889 A * | 4/1963 | Irbitis | ............................. 244/55 |
| 3,095,696 A * | 7/1963 | Rumble | .......................... 60/770 |
| 4,239,155 A * | 12/1980 | Foa | .......................... 239/265.17 |
| 4,488,399 A * | 12/1984 | Robey et al. | ..................... 60/262 |
| 4,892,269 A * | 1/1990 | Greco et al. | ................. 244/53 R |
| 4,930,725 A * | 6/1990 | Thompson et al. | ......... 244/53 R |
| 5,079,916 A * | 1/1992 | Johnson | .......................... 60/268 |
| 5,163,286 A * | 11/1992 | Jaw | ............................... 60/39.17 |
| 5,197,855 A | 3/1993 | Magliozzi et al. | |
| 6,981,365 B1 * | 1/2006 | Johnson | .......................... 60/247 |
| 7,144,221 B2 * | 12/2006 | Giffin | ............................ 416/189 |

OTHER PUBLICATIONS

British Search Report issued in British Patent Application No. GB0908595.2, on Sep. 7, 2009.

* cited by examiner

*Primary Examiner* — Phutthiwat Wongwian
*Assistant Examiner* — William Breazeal
(74) *Attorney, Agent, or Firm* — Oliff PLC

(57) ABSTRACT

A propfan engine has a power-producing core, a plurality of nozzles for exhausting exhaust gas from the core, and a row of propeller blades rotatable about an axis. The blades are positioned downstream of the exhaust nozzles. The exhaust nozzles are rotatable about said axis. The nozzles can be aligned with the gaps between successive propeller blades in order to reduce noise during operation of the engine.

13 Claims, 4 Drawing Sheets

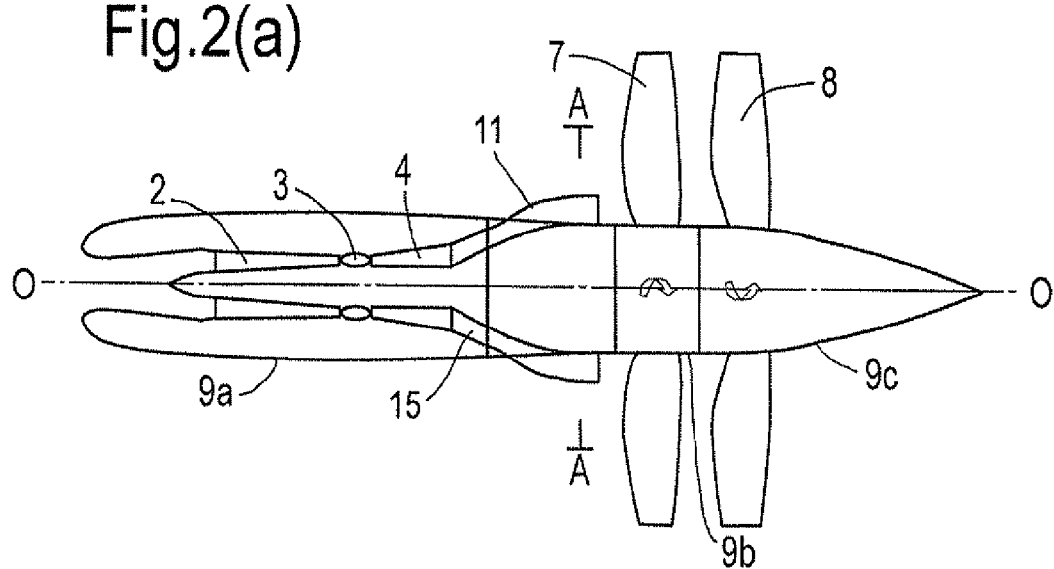
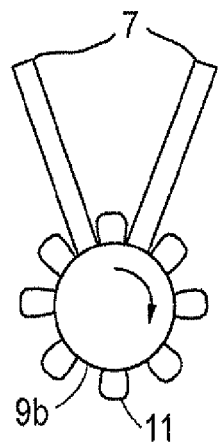
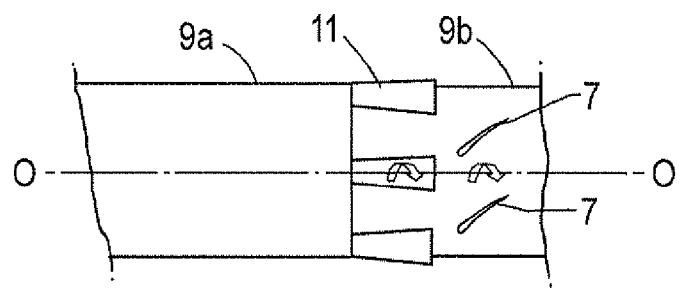

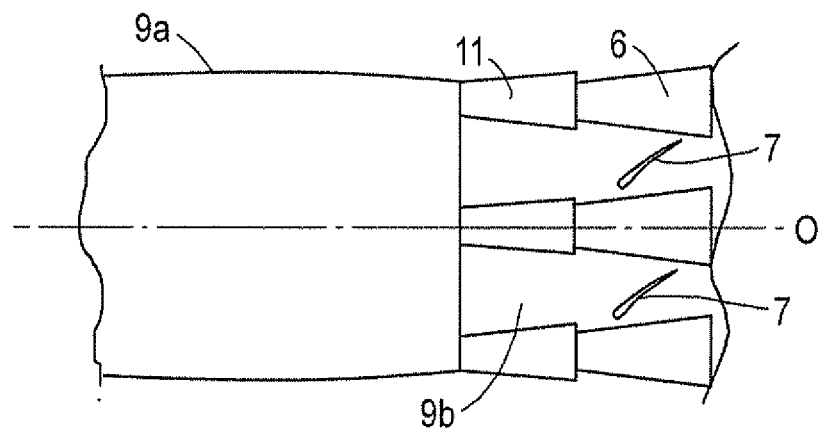
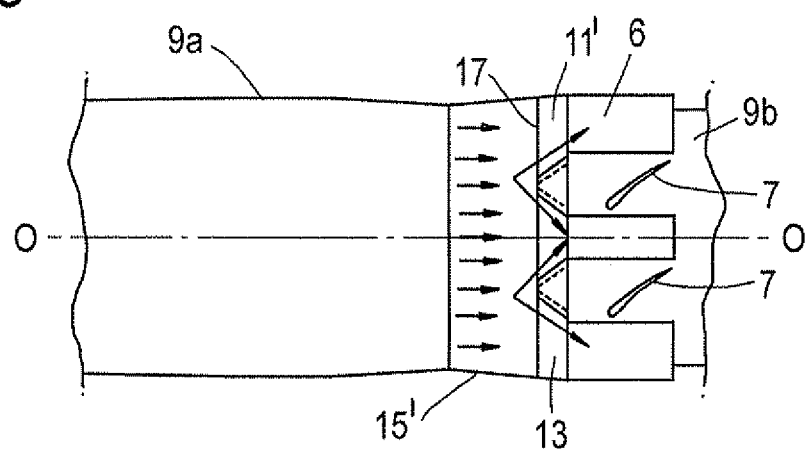

PROPFAN ENGINE

The present invention relates to propfan engines.

A typical gas turbine aero engine comprises a compressor, through which air from outside the engine is taken in and compressed, and a combustor, in which the gas is mixed with fuel and combusted. The combusted gas is then used to drive a turbine downstream of the core, before being expelled through an exhaust. Some of the power extracted by the turbine is used to drive the compressor.

In turbofans, the turbine also powers a fan upstream of the compressor. This allows the engine to drive additional air outside the core engine. High bypass turbofans are commonly used on commercial aircraft as they can deliver good fuel efficiencies for a given thrust with relatively low noise levels. However, there is a continuing need to improve fuel economy and reduce noise levels.

Propfan engines are a class of engine that have the potential to improve efficiencies. In a propfan engine, the fan is replaced by a propeller, disposed outside of the engine nacelle. Like the fan, the propeller increases the amount of gas accelerated by the engine. However, since the propeller is not enclosed within the nacelle, the weight of the engine can be significantly reduced.

Nonetheless, to date propfans have seen limited use in commercial aircraft. Positioning the propeller at the front of the engine adds to the complexity of the design of the engine intake. An alternative is to position the propeller at the engine rear, however, this incurs the problem that exhaust from the engine is directed into the path of the propeller rotor blades, resulting in severe noise, typically above that which is acceptable for modern aircraft applications. Increasing the axial distance between the exit plane of the exhaust and the rotor blades can reduce the noise, but in practice the distance required is unacceptably large.

It is therefore desirable to provide a propfan engine which produces less noise.

Thus, according to the present invention, there is provided a propfan engine having:

a power-producing core (typically a gas turbine engine), a plurality of nozzles for exhausting exhaust gas from the core, and a row of propeller blades rotatable about an axis, the blades being positioned downstream of the exhaust nozzles;

wherein the exhaust nozzles are rotatable about said axis.

In this way, a propfan with a rear mounted propeller can be provided in which the interaction between the exhaust gas and the propeller can be controlled. In particular, the interaction can be controlled so as to reduce the production of noise.

For example, the exhaust nozzles can be configured to rotate at the same angular velocity as the propeller blades. Advantageously, the exhaust nozzles can be aligned relative to the propeller blades such that substantially all of the exhaust gas emitted from the nozzles is directed between the propeller blades. In this way, impact of the exhaust with the propeller blades can be avoided, thus reducing the amount of noise created by the engine.

However, the exhaust nozzles may be aligned relative to the propeller blades such that a part of the exhaust gas emitted from the nozzles impinges on the propeller blades. For example, having a small fraction of the exhaust impinging on the blades may be useful in restricting the build up of ice on the blades, without incurring a significant noise penalty.

Preferably, the engine has a further row of counter-rotating propeller blades downstream of the first row of propeller blades. Although the further row of propeller blades generally rotates in the opposite direction to the exhaust nozzles, the interaction between these blades and is relatively weak, and does not typically lead to excessive noise. Alternatively, the engine may have only a single row of propeller blades.

The individual nozzles may be separate components, or may be formed by a single component. For example, the exhaust nozzles may be formed by internal passages of a rotatable shroud which rotates about the same axis as the propeller blades.

The exhaust gases may be directed towards the exhaust nozzles from the power-producing core through a static annular exhaust duct. A sealing arrangement to prevent hot exhaust gas leakage will generally be required at some point between the power-producing core and rotatable exhaust nozzles. The provision of a static annular exhaust duct allows that arrangement to be between the duct and the nozzles, and located at a position that is most appropriate for the particular engine design.

Embodiments of the invention will now be described by way of example with reference to the accompanying drawings in which:

FIG. 2 shows schematically (a) a longitudinal cross section and (b) a transverse cross section at plane A-A through a propfan engine according to a first embodiment of the invention, and (c) a closer view of the exhaust nozzle and propeller arrangement of the engine;

FIG. 3 is a similar schematic view to that of FIG. 2(c), but further shows exhaust being emitted from exhaust nozzles of the engine of the first embodiment;

FIG. 5 is a similar schematic view to that of FIG. 4(b) but further shows exhaust being emitted from exhaust nozzles of the engine of the second embodiment.

Figure 1A:
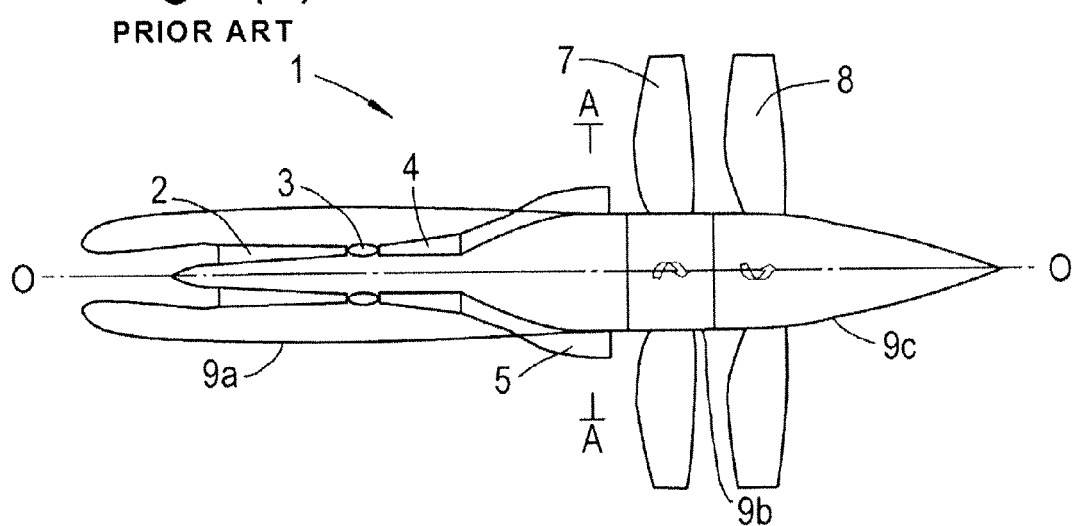
FIG. 1 shows schematically (a) a longitudinal cross section and (b) a transverse cross section at plane A-A through a conventional propfan engine.
Figure 1B:
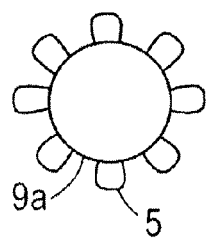

FIG. 1 shows schematically (a) a longitudinal cross section and (b) a transverse cross section at plane A-A through a conventional propfan engine. The engine has a gas turbine power producing core with, in flow series, a compressor (2), a combustion section (3) and a turbine (4). The turbine extracts power from the flow of combusted gas to drive the rotation of a front row of propeller blades (7) and a rear counter-rotating row of propeller blades (8) about the engine axis O-O. The engine has a nacelle which is divided into a static portion (9a) which houses the gas turbine and to which is mounted the exhaust nozzles (5), a first rotating portion (9b) from which the front propeller blades (7) extend, and a second counter-rotating portion (9c) from which the rear propeller blades (8) extend. The hot exhaust gas exiting from the turbine is ducted to the outer surface of the nacelle, where it is exhausted through a series of circumferentially spaced exhaust nozzles (5) into the flow path of the front propeller. The impingement of the exhaust on the front propeller blades results in significant noise during operation of the engine.

FIG. 2 shows schematically (a) a longitudinal cross section and (b) a transverse cross section at plane A-A through a propfan engine according to a first embodiment of the invention, and (c) a closer view of the exhaust nozzle and propeller arrangement of the engine. The same reference numbers are used to indicate features which are similar in the first embodiment and the conventional engine of FIG. 1. In this embodiment, circumferentially spaced exhaust nozzles (11) again exhaust hot gas from the gas turbine core. However, the nozzles are now configured to rotate about the engine axis, with the same rotation direction and the same angular velocity as the front propeller blades (7). In particular, the rotatable nozzles are mounted to the first rotating portion (9b) of the nacelle, rather than the static portion (9a), the interface between the static and rotating portions being moved upstream relative to the conventional engine. A static annular exhaust (15) bridges the exit of the turbine (4) and the entrance to the exhaust nozzles. At the interface between static annular exhaust and the exhaust nozzles, inner and outer seals (not shown) between the static and rotating components prevent leakage of hot exhaust to other areas of the engine.

As shown in FIG. 3, which is a similar view to that of FIG. 2(c), the nozzles are aligned relative to the propeller blades such that substantially all of the exhaust gas (6) emitted from the nozzles is directed between the propeller blades. This alignment is also illustrated in FIG. 2(b), in which the relative angular positions of two of the front propeller blades (7) are indicated. By aligning the exhaust nozzles with the gaps between rotor blades, the exhaust jets (6) no longer impact on the front propeller blades, thus reducing the level of noise created by the engine. A further option, however, is to offset the nozzles slightly relative to the gaps between the blades such that a portion of the exhaust gas impinges on the blades. The portion can be sufficient to restrict the build up of ice on the blades while not significantly increasing engine noise levels.

Figure 4A:
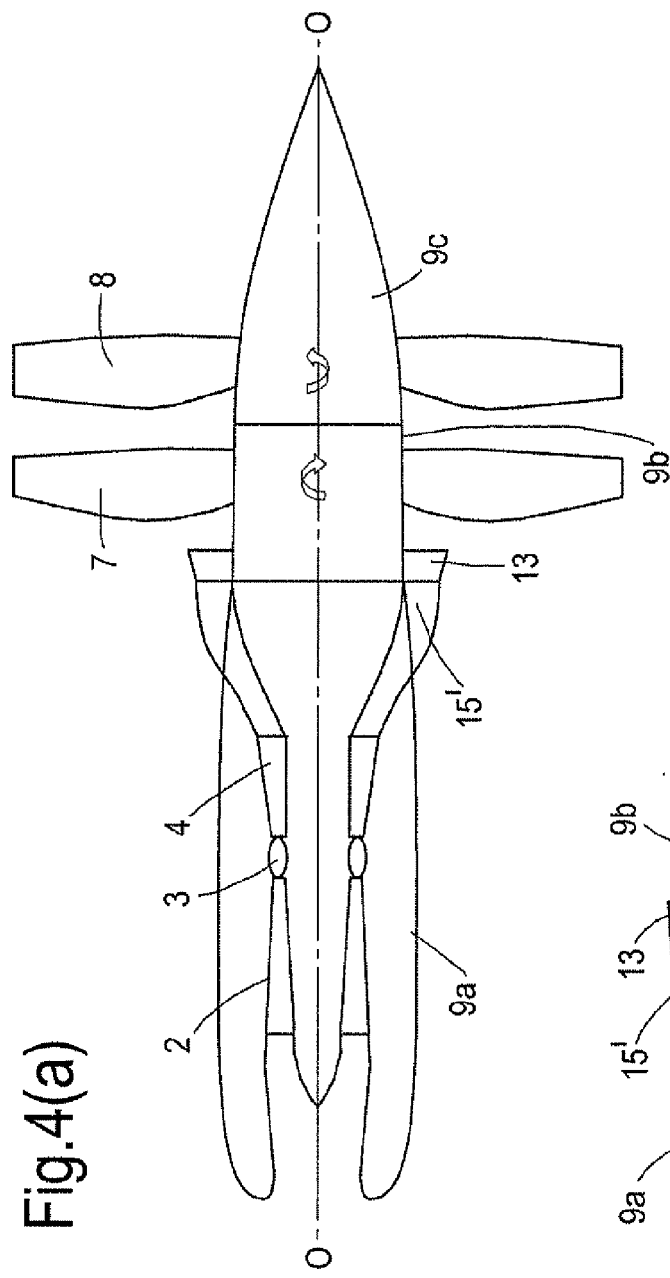
FIG. 4 shows schematically (a) a longitudinal cross section through a propfan engine according to a second embodiment of the invention, and (b) a closer view of the exhaust nozzle and propeller arrangement of the engine.

FIG. 4 shows schematically (a) a longitudinal cross section through a propfan engine according to a second embodiment of the invention, and (b) a closer view of the exhaust nozzle and propeller arrangement of the engine. In this embodiment, the nozzles (11') are formed as passageways through a shroud (13) which is centred upon and rotates about the same axis as the propeller. The exhaust gases are directed to the shroud through an annular exhaust (15') which remains static during operation of the engine.

Figure 4B:
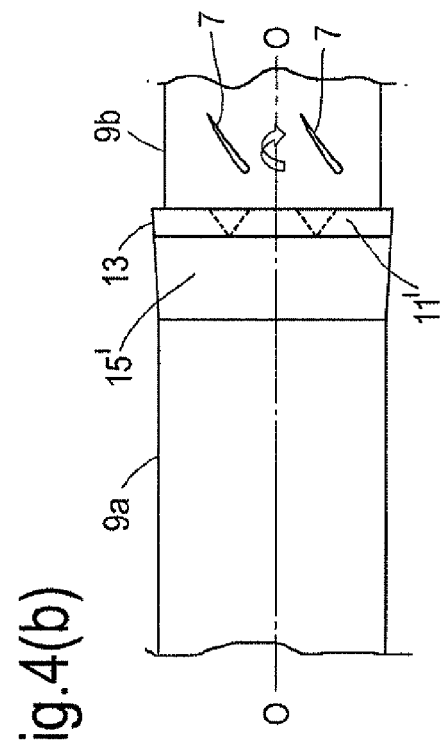

FIG. 5, which is a similar view to that of FIG. 4(b), illustrates the flow of exhaust gases through the annular exhaust (15') and nozzles (11') by arrows. The rotating shroud (13) forms an interface (17) with the static annular exhaust duct, the interface having inner and outer seals (not shown) which prevent leakage of hot exhaust to other areas of the engine. Exhaust gas passes out of the annular exhaust duct and through the exhaust nozzles (5) which are formed as passageways through the rotating shroud. Again, the nozzles are aligned relative to the propeller blades (7) such that substantially all of the exhaust gas (6) emitted from the nozzles is directed between the propeller blades.

An advantage of the first embodiment shown in FIGS. 2 and 3 is that the outer surfaces of the exhaust nozzles (11) are more exposed to the cold external air flow, which can promote mixing of the hot exhaust gas with the cold external air flow and further reduce the exposure of the propeller blades (7) to hot gases. On the other hand, the relatively exposed exhaust nozzles of the first embodiment might increase drag compared to the more enclosed exhaust nozzles of the second embodiment shown in FIGS. 4 and 5.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A propfan engine comprising:
   a power-producing core including a compressor, a combustion section, and a turbine;
   a plurality of nozzles for exhausting exhaust gas from the core; and
   a row of propeller blades rotatable about an axis, the blades being positioned downstream of the exhaust nozzles and the turbine being arranged to drive rotation of the row of propeller blades, wherein:
   the exhaust nozzles are rotatable about said axis; and
   the propfan engine is configured such that, during use, hot exhaust gas exiting from the turbine is ducted to an outer surface of the engine and exhausted through the exhaust nozzles to the external airflow into a flow path of the propeller blades.

2. The propfan engine according to claim 1, wherein the exhaust nozzles and the propeller blades are configured to rotate at the same angular velocity.

3. The propfan engine according to claim 1, wherein the exhaust nozzles are aligned relative to the propeller blades such that substantially all of the exhaust gas emitted from the nozzles is directed between the propeller blades.

4. The propfan engine according to claim 1, wherein the exhaust nozzles are aligned relative to the propeller blades such that a part of the exhaust gas emitted from the nozzles impinges on the propeller blades.

5. The propfan engine according to claim 1, wherein the exhaust nozzles are formed by internal passages of a rotatable shroud centred on said axis.

6. The propfan engine according to claim 1, further comprising a static annular exhaust duct which directs exhaust gas from the core to the exhaust nozzles.

7. The propfan engine according to claim 1, further comprising a row of counter-rotating propeller blades downstream of the first row of propeller blades.

8. The propfan engine according to claim 2, further comprising a row of counter-rotating propeller blades downstream of the first row of propeller blades.

9. The propfan engine according to claim 3, further comprising a row of counter-rotating propeller blades downstream of the first row of propeller blades.

10. The propfan engine according to claim 4, further comprising a row of counter-rotating propeller blades downstream of the first row of propeller blades.

11. The propfan engine according to claim 5, further comprising a row of counter-rotating propeller blades downstream of the first row of propeller blades.

12. The propfan engine according to claim 6, further comprising a row of counter-rotating propeller blades downstream of the first row of propeller blades.

13. The propfan engine according to claim 1, wherein the exhaust nozzles are located downstream of the core.

* * * * *